United States Patent [19]

Dieterich

[11] 4,192,938

[45] Mar. 11, 1980

[54] MODIFIED POLYISOCYANATES CONTAINING SULFONIC ACID ESTER GROUPS

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 1,815

[22] Filed: Jan. 8, 1979

[30] Foreign Application Priority Data

Jan. 12, 1978 [DE] Fed. Rep. of Germany ....... 2801130

[51] Int. Cl.$^2$ ..................... C08G 18/77; C08G 18/14; C07C 143/68
[52] U.S. Cl. ..................................... 528/67; 252/182; 260/456 P; 260/453 AR; 521/160; 521/162; 521/179; 528/71; 528/73
[58] Field of Search ..................... 521/160, 162, 179; 528/67, 71, 73; 260/456 P

[56] References Cited

U.S. PATENT DOCUMENTS

| | | |
|---|---|---|
| 2,901,497 | 8/1959 | Delfs et al. ........................ 260/456 P |
| 3,535,274 | 10/1970 | Dieterich et al. ...................... 528/71 |
| 3,826,769 | 7/1974 | Carlson ................................ 528/48 |
| 3,988,268 | 10/1976 | Dietrich et al. ...................... 521/162 |
| 3,993,614 | 11/1976 | Carlson .................................. 528/71 |
| 4,119,658 | 10/1978 | Dieterich ....................... 260/29.2 TN |

FOREIGN PATENT DOCUMENTS 2227111 12/1973 Fed. Rep. of Germany.
2359611 6/1975 Fed. Rep. of Germany.
2359615 6/1975 Fed. Rep. of Germany.

*Primary Examiner*—H.S. Cockeram
*Attorney, Agent, or Firm*—Gene Harsh; Joseph C. Gil; R. Brent Olson

[57] ABSTRACT

The instant invention is directed to a process for the preparation of modified polyisocyanates which contain sulfonic acid alkyl ester groups and in which the isocyanate groups may be at least partly in the dimerized form, comprising: reacting isocyanatoaryl sulfonic acids having at least two isocyanate groups and wherein the isocyanate groups may be at least partly in the dimerized form, optionally as mixtures with mono and/or polyisocyanates which are free from sulfonic acid groups, with lactones at 0° to 190° C., wherein at least one of said lactones is a 6 to 9 membered ring lactone and the equivalent ratio of isocyanate groups, including any isocyanate groups present in the dimerized form, to sulfonic acid groups is greater than 1 and the equivalent ratio of lactone groups to sulfonic acid groups is from 0.1:1 to 10:1.

12 Claims, No Drawings

MODIFIED POLYISOCYANATES CONTAINING SULFONIC ACID ESTER GROUPS

BACKGROUND OF THE INVENTION

Sulfonic acids of aromatic polyisocyanates are known and have been described, for example, in German Offenlegungsschriften 2,227,111 and 2,359,615 and U.S. Pat. No. 3,826,769. They are obtained by simply reacting the corresponding aromatic polyisocyanate with a sulfonating agent such as sulfur trioxide, an adduct of sulfur trioxide, oleum, chlorosulfonic acid or sulfuric acid.

The product obtained may be a solid, resinous, or pulverulent sulfonation product or a solution or dispersion of a sulfonated isocyanate in unchanged starting material, depending on the isocyanate used and the degree of sulfonation.

The preparation of polyurethanes or polyurethane ureas based on polyisocyanates containing sulfonic acid groups has been described, for example, in U.S. Pat. No. 3,826,769 and in German Offenlegungsschrift 2,359,611. Polyurethanes and polyureas which have been modified in this way with sulfonic acid or sulfonate groups frequently have a very hydrophilic character, and for this reason the proportion of sulfonic acid groups is generally kept as low as possible. Partially sulfonated polyisocyanates and solutions of isocyanato-sulfonic acids in polyisocyanates are of special importance for this reason. The main advantage of sulfonated polyisocyanates is due to the high polarity of sulfonic acid groups. This gives rise to marked interactions or forces of adhesion or relation to polar media and substrates such as water, and moist and polar surfaces particularly those of an inorganic nature.

Chemically uniform or persulfonated isocyanatosulfonic acids, on the other hand, have high melting points and a low degree of solubility in organic media. Also, they are extremely sensitive to water and atmospheric moisture. These characteristics make the products difficult to process. The highly acid character is also frequently a disadvantage. Discoloration and premature degradation of polyurethanes produced from these substances make the products difficult to use in practice. Although these phenomena can be prevented by suitable neutralization methods, these increase the hydrophilic character of the products.

There is therefore a demand for polyisocyanates which would have a polar character (with its attendant advantages such as a low vapor pressure and improved adhesiveness) and would, at the same time, be predominantly hydrophobic.

There is also a demand for readily available aromatic polyisocyanates from which could be synthesized oligomers and polymers which give rise to toxicologically harmless products on hydrolytic degradation.

DESCRIPTION OF THE INVENTION

The present invention relates to a solution to these problems. It has surprisingly been found that when aromatic polyisocyanatosulfonic acids are reacted with lactones under conditions in which there is an increase in molecular weight, the products obtained are novel aromatic polyisocyanates which are characterized by the presence of sulfonic acid ester groups.

The new polyisocyanates according to the present invention have numerous advantageous properties compared with known polyisocyanates:

1. They have a highly polar character, exceptionally low vapor pressure and excellent compatability with numerous polar and apolar media and reactants.
2. The hydrophilic character of the products can be controlled within wide limits by the chemical nature and quantity of the lactone used. Hydrophobic polyisocyanates are obtained when the sulfonic acid groups are completely reacted with lactones.
3. The hydrolytic degradation of the products leads to toxicologically harmless polyamino sulfonic acids.
4. The functionality of the polyisocyanates according to the invention can be increased by the reaction. In particular, relatively highly functional polyisocyanates having a low vapor pressure can be obtained from bifunctional isocyanates by the processing according to the invention.
5. Use of the polyisocyanates according to the invention, for example in the preparation of polyurethanes, results in polymers with improved fire characteristics.

It has surprisingly been found that lactones behave at least partially as bi-functional compounds when they react with isocyanatosulfonic acids. It is assumed that the lactone ring is initially opened by the sulfonic acid group in a rapid reaction, giving rise to a carboxyl group which in turn reacts more slowly with an isocyanate group. The reaction therefore not only results in a modification of the sulfonic acid group to a hydrophobic sulfonic acid ester group but also leads to a chain lengthening or chain linking by an aryl sulfonic acid amide alkyl ester group.

The present invention thus relates to a process for the preparation of modified polyisocyanates which contain sulfonic acid alkyl ester groups and in which the isocyanate groups may be at least partly in the dimerized form, comprising reacting isocyanatoaryl sulfonic acids having at least two isocyanate groups and wherein the isocyanate groups may be at least partly in the dimerized form, with lactones at temperatures from 0° to 190° C., optionally as mixtures with mono and/or polyisocyanates which are free from sulfonic acid groups, wherein the equivalent ratio of isocyanate groups including any isocyanate groups present in the dimerized form to sulfonic acid groups is greater than 1 and the equivalent ratio of lactone to the sulfonic acid groups is from 0.1:1 to 10:1.

The present invention also relates to the preferred modified polyisocyanates obtainable by the process according to the invention, comprising:

(a) 4 to 48% by weight of isocyanate groups, optionally partly in the dimerized form,
(b) 0.3 to 38% by weight of groups of the formula $SO_2-O-$ forming part of an aryl sulfonic acid alkyl ester group,
(c) 0 to 36% by weight of $-SO_3H$ groups,
(d) 0 to 25% by weight of amide groups $-NH-CO-$ and
(e) 0 to 28% by weight of acyl urea groups $-NH-CO-N-CO$ wherein the groups mentioned under (d) and (e) together amount to at least 0.4% by weight and no more than 28% by weight and the groups mentioned under (b) and (c) together amount to no more than 38% by weight.

Finally, the present invention relates to the use of the modified polyisocyanates obtainable by the process according to the invention as starting materials for the preparation of oligomeric or polymeric polyaddition products.

When carrying out the process of the invention, addition of the lactone to the sulfonic acid group of the aromatic isocyanatosulfonic acid with formation of isocyanato aryl sulfonic acid carboxyalkyl esters takes place in a first reaction step. Thus, for example, diisocyanatobenzene sulfonic acid (I) reacts with ε-caprolactone (II) in the first reaction stage of the process of the invention to form the corresponding diisocyanatobenzene sulfonic acid carboxyalkyl ester (III):

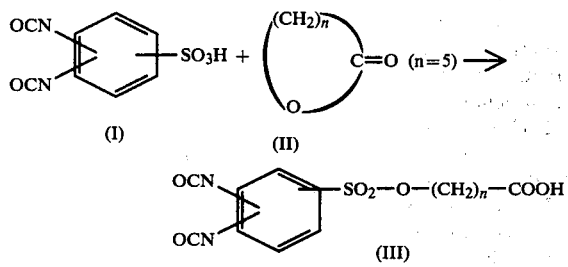

When less than equivalent quantities of lactones are used, mixtures also containing unreacted isocyanatoaryl sulfonic acids are formed in the first reaction stage of the process according to the invention.

If the carboxyl group formed in the first stage of the reaction is not prevented, for example by steric hindrance, from undergoing further reaction, the second reaction stage of the process according to the invention gives rise to compounds containing excess isocyanate groups, sulfonic acid alkyl ester groups and amide groups. Thus, for example, the intermediate product (III) indicated above may undergo a chain lengthening reaction with itself to form higher molecular weight compounds corresponding to the following formula (IV):

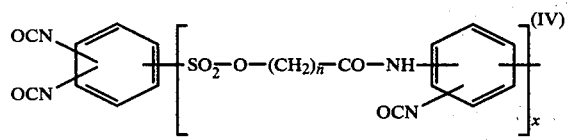

wherein x=0 to 20. Any isocyanates present in the reaction mixture which are free from carboxyl groups, which may be either isocyanatoaryl sulfonic acids which have not hitherto taken part in the reaction or any mono or polyisocyanates present in the reaction mixture which are free from sulfonic acid groups, may cause chain breaking to form end groups corresponding to the following formula (V)

$$-SO_2O-(CH_2)_n-CO-NH-R \quad (V)$$

wherein R represents the group obtained by removal of an isocyanate group from a mono or polyisocyanate which is free from hydroxyl groups.

It will readily be seen that the size of the number x in formula IV depends on the nature and proportions of the starting materials used. Thus, when polyisocyanatoaryl sulfonic acids are used as the only isocyanate component, the second stage of the process according to the invention carried out with equivalent or excess quantities of lactones gives rise to comparatively high molecular weight compounds, whereas subequivalent quantities of lactones and/or the addition of mono or polyisocyanates which are free from sulfonic acid groups give rise to comparatively low molecular weight compounds in which x may even be zero.

Depending on the reactivity of the isocyanates used as starting materials and on the reaction conditions employed, in particular the reaction temperature, a third reaction stage may take place in the process according to the invention, in which derivatives containing acyl urea groups may be formed by the addition of isocyanate groups to the amide groups. From what has been said above, it will readily be seen that when carrying out the process of the invention, the molecular size and degree of branching and hence the viscosity and isocyanate functionality of the products of the process can easily be adjusted by suitable choice of the starting materials, their proportions, and the reaction conditions. Instead of the starting materials mentioned as examples above, any of the starting materials exemplified below may be used, and in particular isocyanatoaryl sulfonic acids, lactones, and mono or polyisocyanates which are free from sulfonic acid groups.

The process according the invention thus preferably gives rise to modified polyisocyanates which, in addition to isocyanate groups and sulfonic acid alkyl ester groups, may contain free sulfonic acid groups and contain at least 0.4% of amido and/or acyl urea groups. Since the isocyanatoaryl sulfonic acids used as starting materials are frequently present at least partly in a dimerized form (uretdiones), polyisocyanates which have been modified according to the invention frequently also have their isocyanate groups at least partly in the dimerized form.

The preferred modified polyisocyanates obtainable by the process according to the invention comprise:
(a) 4 to 48% by weight, preferably from 10 to 40% by weight of isocyanate groups, optionally in the dimerized form;
(b) 0.3 to 38% by weight, preferably from 0.6 to 28% by weight of —SO₂—O—groups forming part of an aryl sulfonic acid alkyl ester group;
(c) 0 to 36% by weight, preferably from 0 to 10% by weight of sulfonic acid groups —SO₃H;
(d) 0 to 25% by weight, preferably from 0.2 to 20% by weight of amid groups —NH—CO and
(e) 0 to 28% by weight, preferably from 0.2 to 20% by weight of acyl urea groups

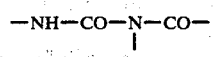

the total quantity of groups mentioned under (d) and (e) amounting to at least 0.4% by weight and no more than 28% by weight and the total quantity of groups mentioned under (b) and (c) amounting to no more than 38% by weight.

The isocyanatoaryl sulfonic acids used in the process according to the invention may be sulfonation products of any known aromatic polyisocyanates. The following are examples of such aromatic polyisocyanates used in the form of their sulfonation products in the process according to the invention:

4,4'-stilbene diisocyanates; 4,4'-dibenzyl diisocyanate; 3,3'- and 2,2'-dimethyl-4,4'-diisocyanato-diphenyl methane; 2,5,2'5'-tetramethyl-4,4'-diisocyanato-diphenyl methane; 3,3'-dimethoxy-4,4'-diisocyanato-diphenyl methane; 3,3'-dichloro-4,4'-diisocyanato-diphenyl methane; 4,4'-diisocyanato-diphenyl-cyclohexyl methane; 4,4'-diisocyanatobenzophenone; 4,4'-diisocyanato-diphenyl sulfone; 4,4'-diisocyanato-diphenyl ether; 4,4'-diisocyanato-3,3'-dibromo-diphenyl methane; 4,4'-diisocyanto-3,3'-diethyl-diphenyl methane; 4,4'-diisocyanato-diphenyl-ethylene-(1,2); 4,4'-diisocyanatodiphenyl-sulfide; 1,3- and 1,4-phenylene diisocyanate; 2,4- and 2,6-tolylene diisocyanate and any mixtures of these isomers; diphenyl methane-2,4'- and/or -4,4'-diisocyanate; naphthylene-1,5-diisocyanate; triphenyl methane-4,4,4''-triisocyanate; polyphenyl-polymethylene polyisocyanates such as may be obtained by aniline-formaldehyde condensation followed by phosgenation, as described e.g. in British Pat. Nos. 874,430 and 848,671; polyisocyanates containing carbodiimide groups as described in German Pat. No. 1,092,007; diisocyantes as described in U.S. Pat. No. 3,492,330, polyisocyanates containing allophanate groups as described e.g. in British Pat. No. 994,890, Belgian Pat. No. 761,626 and published Dutch Patent Application 7,102,524, polyisocyanates containing isocyanurate groups as described e.g. in German Pat. Nos. 1,022,789; 1,222,067 and 1,027,394 and in German Offenlegungsschriften 1,929,034 and 2,004,048, polyisocyanates containing acylated urea groups according to German Pat. No. 1,230,778, and polyisocyanates containing biuret groups as described e.g. in German Pat. No. 1,101,394, British Pat. No. 889,050 and French Pat. No. 7,017,514. The distillation residues obtained from the commercial production of isocyanates and still containing isocyanate groups may also be used, optionally dissolved in one or more of the polyisocyanates mentioned above. Any mixtures of the above mentioned polyisocyanates may also be used.

Phosgenation products of condensates of aniline and aldehydes or ketones such as acetaldehyde, propionaldehyde, butyraldehyde, acetone or methylethyl ketone may also be used.

The phosgenation products of condensates of anilines which are alkyl substituted on the nucleus are also suitable, in particular condensates of toluidines with aldehydes or ketones such as formaldehyde, acetaldehyde, butyraldehyde, acetone or methylethyl ketone.

Reaction products of the above mentioned aromatic polyisocyanate mixtures with from 0.2 to 50 mol percent of polyols are also suitable, provided that the viscosity of the resulting reaction products does not exceed 50,000 cP at 25° C. and the isocyanate content of the reaction products is at least 6% by weight. Suitable polyols for the modification of the starting materials include, in particular, the polyether polyols and/or polyester polyols well known in polyurethane chemistry which have molecular weights in the range of from 200 to 6,000, preferably from 300 to 4,000, and low molecular weight polyols with molecular weights in the range of from 62 to 200. Examples of such low molecular weight polyols include ethylene glycol, propylene glycol, glycerol, trimethylol propane and 1,4,6-hexanetriol.

Particularly preferred isocyanatoaryl sulfonic acids are the sulfonation products of 2,4-tolylene diisocyanate and of mixtures of 2,4- and 2,6-tolylene diisocyanate as well as sulfonation products of polyisocyanates obtained by the phosgenation of aniline/formaldehyde condensates. These mixtures contain, in particular, 4,4'-diisocyanato-diphenyl methane and 2,4'-diisocyanato-diphenyl methane as well as higher nuclear homologues of these products. It is in principle immaterial what sulfonating agents have been used to prepare the isocyanatoaryl sulfonic acids. Suitable sulfonating agents are, for example, sulfur trioxide, oleum, sulfuric acid, and complexes of sulfur trioxide with Lewis bases which contain oxygen, nitrogen or phosphorus atoms. However, any other sulfonating agents, such as chlorosulfonic acid and acyl sulfates may also be used, for example acetyl sulfate or reaction products of acid anhydrides with sulfuric acid or oleum. Side reactions such as the formation of urea or biuret or the partial conversion of isocyanate groups into carbamic acid chloride groups or acylamide groups are generally of no significance. This is especially true for the preparation of only partially sulfonated isocyanates, so that compounds such as sulfuric acid, chlorosulfonic acid or acetyl sulfate may well be used in such cases. For the preparation of highly sulfonated polyisocyanates, on the other hand, it is preferred to use sulfur trioxide or its complexes, according to German Offenlegungsschrift 2,510,693. It follows that it is also preferred to use, in particular, aromatic polyisocyanatoaryl sulfonic acids based on tolylene diisocyanate or diphenyl methane diisocyanate which contain urea or biuret groups.

Solutions and dispersions of isocyanatoaryl sulfonic acids in unsulfonated liquid polyisocyanates are particularly preferred. Such products are obtained, for example, from the partial sulfonation of aromatic polyisocyanates. The partial sulfonation of chemically uniform diisocyanates or of binary isomeric mixtures generally gives rise to suspensions, whereas the partial sulfonation of multi-component mixtures gives rise to homogeneous solutions. According to the invention, it is immaterial whether solutions or suspensions are used in the process. Partially sulfonated polyisocyanate mixtures such as are obtained by the phosgenation of aniline-formaldehyde condensates and which have been described in German Offenlegungsschriften 2,227,111; 2,359,614 and 2,359,615 are particularly preferred. Suspensions of diisocyanatotoluene-sulfonic acid dimers and of diisocyanato-diphenyl methane-sulfonic acid dimers in diisocyanatotoluene or diisocyanato-diphenyl methane are also particularly preferred.

The preparation of the isocyanatoaryl sulfonic acids used in the process of the invention and of the mixtures of these acids with unsulfonated aromatic polyisocyanates is carried out by methods known in the art or by analogous methods. Examples are those based on the publications already mentioned above or U.S. Pat. No. 3,286,769. The processes described in U.S. Pat. No. 4,119,658 or U.S. patent application Ser. No. 848,969 are also suitable for the preparation of isocyanatoaryl sulfonic acids which may be used in the process of the invention.

Solutions or suspensions of the isocyanatoaryl sulfonic acids exemplified above in aliphatic polyisocyanates, such as tetramethylene diisocyanate or hexamethylene diisocyanate; and/or in cycloaliphatic or mixed aliphatic-cycloaliphatic polyisocyanates, such as 4,4'-diisocyanato-dicyclohexyl methane, 2,4- or 2,6-diisocyanato-hexahydrotoluene or 1-isocyanato-3,3,5-trimethyl-5-isocyanatomethylcyclohexane may also be used for the process. Where it is desired to lower the isocyanate functionality of the products obtained according to the invention, solutions or suspensions of isocyanatoaryl sulfonic acids in aromatic, aliphatic or cycloaliphatic monoisocyanates may also be used. Examples of the last mentioned compounds include phenyl isocyanate; tosyl isocyanate; n-hexyl isocyanate; 6-chlorohexyl isocyanate; cyclohexyl isocyanate and methoxymethyl isocyanate. Sulfonated aromatic monoisocyanates such as phenyl isocyanate could also be used as isocyanatoaryl sulfonic acid in combination with unsulfonated polyisocyanates of the type exemplified above. The nature and proportions of the isocyanates used in the process according to the invention and degree of sulfonation are chosen so that the equivalent ratio of isocyanate groups present, optionally partly in the dimerized form, to sulfonic acid groups is greater than 1:1, i.e. in particular from 1.05:1 to 50:1, preferably from 2:1 to 30:1.

The lactones used in the process according to the invention may be any lactones wherein at least one 6 to 9 membered lactone ring is present which may, in addition, be substituted with isocyanate or hydroxyl groups but are otherwise inert under the reaction conditions of lactone/sulfonic acid addition.

Preferred lactones are those containing 6 to 9 ring members represented by the following general formula:

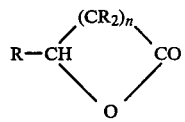

in which n represents a number of from 3 to 6 and the groups R which may be the same or different, represent a hydrogen atom or an alkyl, cycloalkyl, alkoxy or aryl group. The total number of carbon atoms of the substituents should not exceed 12 and at least n+2 of the groups R should be hydrogen atoms.

The lactones used as starting materials for the process according to the invention are preferably unsubstituted ε-caprolactone or substituted ε-caprolactones, for example various monoalkyl-ε-caprolactones. Examples include the monomethyl, monoethyl, monopropyl and monoisopropyl-ε-caprolactones, up to monododecyl-ε-caprolactones dialkyl-ε-caprolactones in which the two alkyl groups may be substituted on the same or different carbon atoms but not both on the ε-carbon atom, provided that the ε-carbon atom is not disubstituted. Alkoxy-ε-caprolactones such as methoxy- and ethoxy-ε-caprolactones and cycloalkyl- and aryl-ε-caprolactones such as cyclohexyl- and phenyl-ε-caprolactones and lactones having more than six carbon atoms in the ring, e.g. δ-oenantholactone and η-caprylactone, may be used.

δ-lactones such as δ-valerolactone and its substitution products may also be used but γ-butyrolactone is less suitable because it does not react so readily.

The lactones used in the process according to the invention and the quantities used are chosen so that the equivalent ratio of lactone groups to sulfonic acid groups is from 0.1:1 to 10:1, and preferably from 0.6:1 to 2:1. If the equivalent ratio is less than 1:1, the —SO₃H groups present are only partly esterified, with the result that the products according to the invention still contain free sulfonic acid groups. The hydrophilic character in the products due to the presence of these sulfonic acid groups can thus be varied by suitable choice of the aforesaid equivalent ratio within the range of from 0.1:1 to 1:1. The lactone component may also be used in excess, for example in order to ensure quantitative esterification of the sulfonic acid groups or, when using compounds which have more than one lactone group, to build free lactone groups into the products of the process. Any excess of lactone put into the the process may, if desired, be removed from the end product by distillation after the process according to the invention.

The process of the invention is generally carried out at temperatures of from 0° to 190° C., preferably from 20° to 140° C.

If the process is carried out batchwise, the polyisocyanate is preferably introduced into a stirrer vessel at room temperature and the lactone is stirred in. The reaction generally sets in at once with evolution of heat. If the proportion of sulfonic acid groups in the polyisocyanate is more than about 10%, it may be advisible to carry out the reaction at lower temperatures, e.g. at 0° to 20° C., if necessary with cooling. However, this measure is generally unnecessary since there is no harm in the reaction mixture being heated to, for example, 140° C. or higher. If it is important to achieve rapid reaction, for example when highly viscous isocyanates are used, it may be advisable to carry out the reaction at higher temperatures, for example, at 40° to 140° C. and, in special cases, the temperature may be raised up to about 190° C.

The reaction is preferably carried out without solvent. However, inert solvents such as dichloroethane, chloroform, tetrachloroethane, trichlorofluoro methane, acetone, toluene or chlorobenzene may be employed.

The reaction of solid polyisocyanatosulfonic acids with lactones causes no problems, since the solid sulfonic acids rapidly go into solution during the reaction. The products obtained from the process are therefore generally homogeneous liquids or highly viscous to solid resins. If the reaction with the lactone is only partial, the products may also be obtained in the form of dispersions still containing solid isocyanatosulfonic acid.

According to a preferred embodiment of the invention, solutions of the isocyantosulfonic acids in organic phosphates are used for the reaction with lactones. Organic phosphites, phosphonates or pyrophosphates may also be used instead of phosphates. Sulfonation is preferably already carried out in the presence of the phosphates and the reaction according to the invention is carried out immediately thereafter. If acid organic phosphates are used, or if transesterification reactions between isocyanatosulfonic acids and phosphate occur after sulfonation, the hydroxyl group of the phosphate is liable to react with the lactone. This must be taken into account when calculating the proportions of starting materials to be used.

Suitable phosphates, phosphites, phosphonates and pyrophosphates have been mentioned, for example, in German Offenlegungsschrift 2,510,693. Tris-(2-chloroethyl)-phosphate is particularly preferred.

The reaction of isocyanatosulfonic acids with lactones is most preferably carried out immediately after the sulfonation reaction. This method has the special advantage that it obviates the need for isolation of the free isocyanatoaryl sulfonic acids, which are extremely sensitive to moisture. According to one particularly preferred embodiment, the polyisocyanate, e.g. tolylene diisocyanate or diisocyanatodiphenyl methane, is sulfonated in a solvent such as chlorobenzene and the resulting suspension is reacted with a lactone. Since the phosgenation reaction for preparing the polyisocyanate is normally also carried out in an inert solvent such as chlorobenzene, the process of phosgenation, sulfonation and esterification may be carried out directly one after the other without isolation of the intermediate stages. The products are, in this way, obtained directly from the corresponding diamine as solutions or dispersions in the solvent used.

If less than about 50% of the polyisocyanate is to be sulfonated and esterified, the process may be carried out in the absence of organic solvents. Sulfonation in that case results in a suspension of the sulfonated polyisocyanate in unchanged starting isocyanate. The suspended solid phase generally goes into solution during the reaction with the lactone and a solution of the sulfonic acid ester in the starting isocyanate is obtained. Due to the high proportion of isocyanate groups to $SO_3H$ groups, the molecular weight of the isocyanatoaryl sulfonic acid ester is, in this case, lower than in the case of complete sulfonation of the polyisocyanate.

The solvent free method may be used, for example, for preparing viscous solutions of tolylene diisocyanate which is modified with sulfonic acid ester groups. These solutions may be used as such, instead of unmodified tolylene diisocyanate, or the free tolylene diisocyanate may be distilled off and the resinous sulfonic acid ester isocyanate isolated. This resinous product may be used as such, for example in laquer powders, or it may be dissolved in solvents or in any polyisocyanates, including aliphatic polyisocyanates. When crude phosgenation products of aniline-formaldehyde condensates are used as polyisocyanates, the solvent free method is to be recommended only if less than about 30%, in particular from 5 to 20%, of the polyisocyanate is sulfonated and reacted with lactone because both sulfonation and esterification, which is generally followed by urethanization, are accompanied by a considerable increase in viscosity.

If a high degree of sulfonation is desired, it is again advisable to use an inert solvent or to carry out sulfonation immediately after phosgenation, before the solvent used for phosgenation is distilled off.

When the isocyanatoaryl sulfonic acids are to be reacted with lactones, it should be borne in mind that the first reaction step, which consists of ring opening of the heterocyclic compound accompanied by esterification, takes place very rapidly. The second reaction step, consisting of the reaction of the resulting —COOH group with the isocyanate groups present, proceeds much more slowly. As a result, the viscosity rises only slowly and elevated temperatures and/or catalysts, e.g. organometallic compounds such as tin dioctoate or dibutyl tin dilaurate, may be used to accelerate the second step of the reaction.

As already mentioned above, the process according to the invention generally gives rise to the formation of modified polyisocyanates which contain free isocyanate groups and amide groups which are capable of reacting further to form the corresponding compounds containing acyl urea groups.

The formation of acyl urea may, in some cases, be desirable for increasing the isocyanate functionality. In such cases, the use of catalysts which accelerate the formation of acyl urea from amide groups and isocyanate groups or the application of elevated temperatures, e.g. above 80° C., is to be recommended. Suitable catalysts are mentioned in German Offenlegungsschrift 2,040,645 or U.S. Pat. No. 3,769,318.

The products obtained by the process according to the invention are valuable starting materials for the production of polyurethane resins by the isocyanate polyaddition process. They are suitable, for example, for the manufacture of cellular and non-cellular elastomers, flexible foams, semi-rigid foams and rigid foams, especially where high standards of cross-linking density, fire characteristics or degradability are demanded. The polyisocyanates according to the invention are therefore suitable, for example, for the manufacture of upholstery materials, mattresses, elastic underlays, car seats, damping materials, shock absorbers, constructional materials, sound insulations and moisture absorbent materials. They may also be used in the surgical field and in the preparation of substrates for plant cultivation, and for protection against heat and cold. The polyisocyanates according to the invention are particularly suitable for the manufacture of inorganic-organic synthetic materials, for example by processes similar to those described in German Pat. No. 2,310,559 and German Offenlegungsschriften 2,227,147 and 2,359,608 and for the manufacture of surface coatings, impregnations and adhesives. Aqueous emulsions may be prepared by dispersion of the polyisocyanates according to the invention in water, optionally in the presence of bases.

EXAMPLES

Example 1

174 g (1 mol) of 2,4-diisocyanatotoluene are introduced into a reaction vessel and 23 g of gaseous sulfur trioxide are passed in at 23°–30° C. The sulfur trioxide is absorbed by the diisocyanate. It is produced by passing a stream of nitrogen through heated 65% oleum. 28.5 g (0.25 mol) of ε-caprolactone are introduced into the resulting suspension at 40°–45° C. within 15 minutes. The reaction mixture is initially heated to 100° C. for 2 hours, then to 110°–115° C. for 4½ hours. A solid, clear solution is obtained. Gas chromatographic analysis of a sample shows that the caprolactone content has dropped sharply. After a further 5 hours heating at 120°–125° C., the product is virtually free from caprolactone. A viscous, clear solution of the sulfonic acid ester in excess diisocyanatotoluene is obtained. No solid precipitate forms even after several months. Sulfur content: 4.0%, NCO content: 32.0%, acid content: 60 milliequivalents/100 g. The acid content includes —COOH and —$SO_3H$ groups as well as the sulfonic acid ester groups which are saponified by the process of determining the acid content. Assuming that no reaction takes place between the lactone and isocyanatosulfonic acid, the following values would be expected:

NCO content: 37.2%; acid content: 239 milliequivalents/100 g. A comparison of these two values with those actually found shows the total amide and acyl urea group content to be ca. 5% by weight.

Example 2

The procedure is the same as in Example 1 but using 25 g of γ-butyrolactone instead of caprolactone. The mixture is stirred at 100°–120° C. for 12 hours and is then clear and homogeneous. No precipitate has formed after 10 months but the viscous mass flows very unevenly. When heated to 60° C., it becomes homogeneous and flows uniformly. Isocyanate content: 31.8%;

sulfur content: 4.05% by weight; acid content: 92 milliequivalents/100 g.

Example 3

The procedure is the same as in Example 2 but using only 4.3 g (0.05 mol) of γ-butyrolactone. A clear, viscous solution is obtained after 15 hours stirring at 100°–135° C. whereas a comparison sample not containing butyrolactone still contains undissolved isocyanatosulfonic acid under these conditions.

Example 4

The procedure is the same as in Example 1 but using 17 g of sulfur trioxide and 29.2 g of coumarin. After the addition of the coumarin, the mixture is stirred at 140° C. for 6 hours, during which time a clear solution is obtained.

Example 5

A crude phosgenation product of an aniline/formaldehyde condensate is distilled to remove enough of the dinuclear content that the distillation residue has a viscosity of 400 cP at 25° C. The resulting product is sulfonated to a sulphur content of 0.96% by passing a stream of sulfur trioxide/nitrogen mixture through it with stirring. After about 8 months, the viscosity is 5,000 cP at 25° C. NCO content: 29.2%; acid content: 31.5 milliequivalents per 100 g.

560 g (about 2 mol) of this sulfonated polyisocyanate are stirred up with 11.4 g (0.1 mol) of ε-caprolactone at room temperature. The viscosity then drops to 3,800 cP. When the mixture is left to stand at room temperature for 3 weeks, the viscosity rises to 4,200. NCO content: 28.4%.

Example 6

The procedure is the same as in Example 5 but using 22.8 g (0.2 mol) of ε-caprolactone. Viscosity after 3 weeks: 3,300 cP; NCO content: 28.4%; acid value: 30.1 milliequivalents per 100 g.

Example 7

The reaction product from Example 6 is heated to 100° C. for 2 hours. The following values are obtained from analysis: viscosity: 3,700 cP; NCO content: 27.7%; acid value: 28.3 milliequivalents per 100 g. Viscosity after 3 weeks: 4,200 cP.

Example 8

2,000 g of a mixture of 60% of 2,4-diisocyanatodiphenyl methane and 40% of 4,4'-diisocyanatodiphenyl methane were gassed with a stream of sulfur trioxide/nitrogen at room temperature until about 73 g of sulfur trioxide had been absorbed. The product had a viscosity of 120 cP, a sulphur content of 1.25% and an isocyanate content of 30.1%; acid content: 32.2 ml of N HCl/100 g.

500 g of this sulfonated polyisocyanate are mixed with 22.3 g of ε-caprolactone at room temperature. The viscosity drops to 80 cP. Analytical data after 3 weeks: viscosity: 90 cP; NCO content: 28.6%; acid value: 28.5 milliequivalents per 100 g.

What is claimed is:

1. A process for the preparation of modified polyisocyanates which contain sulfonic acid alkyl ester groups and in which the isocyanate groups may be at least partly in the dimerized form, comprising: racting isocyanatoaryl sulfonic acids having at least two isocyanate groups and wherein the isocyanate groups may be at least partly in the dimerized form, optionally as mixtures with mono and/or polyisocyanates which are free from sulfonic acid groups with lactones at 0° to 190° C., wherein at least one of said lactones is a 6 to 9 membered ring lactone and the equivalent ratio of isocyanate groups, including any isocyanate groups present in the dimerized form, to sulfonic acid groups is greater than 1 and the equivalent ratio of lactone groups to sulfonic acid groups is from 0.1:1 to 10:1.

2. The process of claim 1, wherein said equivalent ratio of isocyanate groups to sulfonic acid groups is from 1.05:1 to 50:1.

3. The process of claim 2, wherein said equivalent ratio of isocyanate groups to sulfonic acid groups is 2:1 to 30:1.

4. The process of claim 1, wherein said lactone is ε-caprolactone.

5. The process of claim 1, wherein said equivalent ratio of lactone groups to sulfonic acid groups is from 0.6:1 to 2:1.

6. The process of claim 1, wherein said reaction temperature is from 20° to 140° C.

7. The process of claim 1, wherein said isocyanatoaryl sulfonic acids are used in the reaction in the form of solutions in organic phosphates.

8. The process of claim 1, wherein said isocyanatoaryl sulfonic acids in admixture with mono and/or polyisocyanates is the mixture produced by sulfonating aromatic polyisocyanates which are free of sulfonic acid groups.

9. The process of claim 8, wherein said aromatic polyisocyanates which are free of sulfonic acid groups are selected from the group consisting of 2,4-tolylene diisocyanate, 2,6-tolylene diisocyanate, 4,4'-diisocyanato-diphenyl methane, 2,4'-diisocyanato-diphenyl methane, and mixtures thereof.

10. The process of claim 1, wherein said lactones are of the formula:

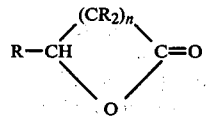

wherein
n represents an integer from 3 to 6,
R which may be the same or different, represents a hydrogen atom or an alkyl, cycloalkyl, alkoxy or aryl group, and the total number of carbon atoms of the substituents does not exceed 12 and at least n+2 of the groups represented by R are hydrogen atoms.

11. Polyisocyanate mixtures, comprising:
(a) 4 to 48% by weight of isocyanate groups optionally present partly in the dimerized form,
(b) 0.3 to 38% by weight of groups of the formula —SO₂—O— forming part of an aryl sulfonic acid alkyl ester group,
(c) 0 to 36% by weight of —SO₃H groups,
(d) 0 to 25% by weight of amide groups —NH—CO— and
(e) 0 to 28% by weight of acyl urea groups

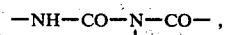

the groups mentioned under (d) and (e) together amounting to at least 0.4% by weight and no more than 28% by weight and the groups mentioned under (b) and (c) together amounting to not more than 38% by weight.

12. In a process for the production of urethane groups containing products comprising reacting an isocyanate with an isocyanate reactive group containing compound, the improvement wherein the isocyanate is a polyisocyanate mixture comprising:

(a) 4 to 48% by weight of isocyanate groups optionally present partly in the dimerized form, (b) 0.3 to 38% by weight of groups of the formula $-SO_2-O-$ forming part of an aryl sulfonic acid alkyl ester group, (c) 0 to 36% by weight of $-SO_3H$ groups, (d) 0 to 25% by weight of amide groups $-NH-CO-$ and (e) 0 to 28% by weight of acyl urea groups

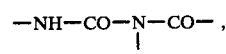

the groups mentioned under (d) and (e) together amounting to at least 0.4% by weight and no more than 28% by weight and the groups mentioned under (b) and (c) together amounting to not more than 38% by weight.

* * * * *